3,214,411
POLYESTER URETHANES MADE WITH DIPHENYLMETHANE DIISOCYANATE WHICH ARE PROCESSABLE BY THERMOPLASTIC TECHNIQUES
James H. Saunders and Kenneth A. Pigott, both of New Martinsville, W. Va., assignors to Mobay Chemical Company, Pittsburgh, Pa., a corporation of Delaware
No Drawing. Filed May 10, 1961, Ser. No. 108,988
7 Claims. (Cl. 260—75)

This invention relates to synthetic polymeric materials and to methods of preparing the same. More particularly, it relates to a process of preparing elastomeric polyurethane plastics utilizing specific reaction components having specific properties which are necessary to give superior products.

It has been heretofore known to mix the reactive components which form a polyurethane plastic to permit the reaction to proceed to form an apparently thermoset elastomeric product and then further molding the elastomer by heating above the first temperature and simultaneously shaping to obtain the desired configuration. It has also been known to use polyesters from adipic acid, 4,4'-diphenylmethane diisocyanate and cross-linking agents such as glycols in the process mentioned above. However, the reactants utilized resulted in products having various disadvantages such as nodules of more highly cross-linked material which form on the surface of the product resulting in irregularities therein. Also, the materials utilized in the heretofore known process resulted in processing difficulties such as, lengthy cure times, reduced physical strength in combination with increased shrinkage and difficulties in molding articles free from flaws.

It has been further suggested to limit the seriousness of one of the above problems, that is the problem of more highly cross-linked material causing nodules on the finished article by intimately mixing the molten elastomeric material after it has been heated above the first temperature which produced the apparently thermoset plastic. This homogenizes the melt so the more highly cross-linked material is dispersed throughout the less cross-linked material and thus prevents it from coming to the surface of the article. This adds another fabrication step to the procedure and, therefore, is undesirable from the standpoint of economics.

This application is a continuation-in-part of U.S. Patent Application Serial No. 44,242 and represents an improvement thereover since the products prepared according to this invention exhibit properties not generally experienced by the processes of that application and the prior art.

It is, therefore, an object of this invention to provide an improved method of making polyurethane plastics. It is another object of this invention to provide polyurethane plastics which do not suffer from the disadvantages of those prepared in accordance with the prior art methods. It is still another object of this invention to provide a method of preparing polyurethane elastomeric plastics utilizing critical reaction components. It is a further object of this invention to provide an improved method of making polyurethane elastomeric plastics wherein the composition of the reactive components is controlled within critical limits.

The foregoing objects and others which will become apparent from the following description are accomplished in accordance with the invention, generally speaking, by providing a method of preparing polyurethane elastomeric plastics by reacting an hydroxyl polyester prepared by the process which comprises condensing adipic acid and a glycol having at least one primary hydroxyl group to an acid number of from about 0.5 to about 2.0 and a water content of from about 0.01% to about 0.2% with 4,4'-diphenylmethane diisocyanate containing less than 5% of 2,4'-diphenylmethane diisocyanate, less than about 2% of the dimer of 4,4'-diphenylmethane diisocyanate and an acidity calculated as HCl of from about 0.0001% to about 0.020% and a chain extending agent, conducting the resulting reaction mixture onto a heated surface, removing the solid polymer formed thereby and shaping the solid polymer into the desired configuration by the application of heat and pressure. The solid polymer may be formed on a heated table, with the result that slabs of the polymer are obtained. If desired, the slab may be cooled to room temperature after removal from the table, this material may then be stored over long periods and subsequently used without the necessity of rushing the procedure to prevent the cross-linking of the material to such an extent that it can no longer be fabricated. The slab of reacted material is a semi-cured polyurethane which has both free —NCO and active hydrogen containing groups. This material may then be readily manipulated into smaller chunks such as by chopping, grinding, dicing and the like. The material may then be fabricated by known techniques such as compression molding, injection molding, extrusion and the like. The products may then be finally cured at elevated temperatures.

As stated previously, the products of the prior art generally contain flaws which may be bubbles or voids in the shaped article and also nodules which appear on the surface thereof. It has been found that by using the particular materials set forth above, in the particular combination indicated, imperfections are no longer present in the final products.

The specific polyester utilized is based on adipic acid. The adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water content is from about 0.01 to about 0.2% and preferably from about 0.01 to 0.05%.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like. In addition to the glycols, a small amount of trihydric alcohol up to about 1% may be used along with the glycols such as, for example, trimethylolpropane, glycerine, hexanetriol and the like. The resulting hydroxyl polyester has a molecular weight of at least about 600, an hydroxyl number of about 25 to about 190 and preferably between about 40 and about 60, an acid number of between about 0.5 and about 2 and a water content of 0.01 to about 0.2%. The average molecular weight per branch point should be at least about 2,000 and preferably greater than 4,000.

It is essential that the polyester have the characteristics described to provide the elastomers prepared therefrom with the necessary properties and to prevent the formation of flaws in the articles.

The organic diisocyanate to be used in the preparation of the specific elastomers in accordance with this invention is 4,4'-diphenylmethane diisocyanate. It is essential that the 4,4'-diphenylmethane diisocyanate contain less than 5% of 2,4'-diphenylmethane diisocyanate and less than 2% of the dimer of diphenylmethane diisocyanate. It is further essential that the acidity calculated as HCl is from about 0.0001 to about 0.02%. The acidity calculated as percent HCl is determined by extracting the chloride from the isocyanate in a hot aqueous methanol solution or by liberating the chloride on hydrolysis with water and titrating the extract with a standard silver nitrate solution to obtain the chloride ion concentration present.

Any suitable chain extending agent having active hydrogen containing groups reactive with isocyanate groups may be used such as, for example, diols including ethylene glycol, propylene glycol, butylene glycol, 1,4-butanediol, butenediol, butynediol, xylylene glycols, amylene glycols, 1,4-phenylene-bis-β-hydroxy ethyl ether, 1,3-phenylene-bis-β-hydroxy ethyl ether, bis-(hydroxy-methyl-cyclohexane), hexanediol, thiodiglycol and the like; diamines including ethylene diamine, propylene diamine, butylene diamine, hexamethylene diamine, cyclohexylene diamine, phenylene diamine, tolylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. The difunctional chain extenders mentioned in U.S. Patents 2,620,516, 2,621,166 and 2,729,618 may be used in the practice of this invention. If desirable, a small amount of a polyfunctional material may be utilized in the practice of this invention. This polyfunctional chain extender, however, should not be present in an amount greater than about 1% by weight. Any suitable polyfunctional compound may be used in this application such as, for example, glycerine, trimethylolpropane, hexanetriol, pentaerythritol and the like.

In accordance with the process of this invention, the polyester, the organic diisocyanate and the chain extender are individually heated preferably to a temperature of from about 60° C. to about 135° C. and then the polyester and chain extender are substantially simultaneously mixed with the diisocyanate. In a preferred embodiment, the chain extender and the polyester each of which has been previously heated, are first mixed and the resulting mixture is mixed with heated diisocyanate. This method is preferred for the reason that the extender and the polyester will not react prior to the introduction of the diisocyanate and rapid mixing with the diisocyanate is thus facilitated. The mixing of the polyester, the chain extender and diisocyanate may be suitably carried out by using any mechanical mixer such as one equipped with a stirrer which results in intimate mixing of the three ingredients in a short period of time. If the material begins to become too thick, either the temperature may be lowered or a small amount of citric acid or the like of from about 0.001 to about 0.050 part by weight based on 100 parts of the polyester may be added to slow down the reaction. Of course, to increase the rate of reaction, any suitable catalyst may be added to the reaction mixture such as tertiary amines and the like as set forth in U.S. Patents 2,620,516, 2,621,166 and 2,729,618. The reaction mixture after complete mixing is conducted onto a suitable heated surface or poured onto a table or conveyor and preferably maintained at a temperature of from about 60° C. to about 135° C. until it solidifies, e.g., into a slab so that it is still a thermoplastic and can be easily removed and reduced to the desired particle size. To facilitate the ready removal of the material from the hot plate, the table, conveyor or other surface, the slab or other physical form may be cut or scored while it is still soft to permit removal in a number of pieces rather than as a unit. This cutting or scoring is best done while the reaction mixture is still soft, for when the material hardens it becomes difficult to cut although it can still be readily reduced in size by grinders, choppers and other equipment known in the industry.

After the reaction mixture has partially reacted to form a hard product which will hereinafter be called a "green stock" and which is suitable for cutting, chopping or grinding, it is cooled to room temperature. This material may then be either stored for several weeks, if desired, or it may be immediately further processed by extrusion, compression molding, injection molding or other similar techniques known in the industry.

If the green stock is to be extruded, it is placed in the hopper of the extruding device at room temperature. The temperature of the material within the extruder is maintained at from about 200 to about 450° F. The compression ratio of the screw of the extruder may be about 3:1 or higher and the screw may have a constant pitch variable root. The extruded part is then cured, for example for 12 to 24 hours at 100 to 110° C.

If the green stock, which has been chopped into chunks, is to be compression molded, the chunks are placed in a suitable mold and preheated to a temperature of from about 250° F. to about 400° F. They are then pressed under high pressure for about two minutes and the mold is then cooled to a temperature below about 250° F. while the pressure is still being applied. After the temperature has fallen below about 250° F., the mold is removed from the press and the sample removed. The sample is then further cured for example, for 12 to 24 hours at 110° C.

When the injection molding technique is used in the manufacture of molded articles by the process of this invention, the cylinder of the injection device through which the material is forced into the mold cavities is maintained at a temperature of from about 200° F. to about 500° F. The mold cavities themselves need not be heated and the molded articles are removed from the cavities from about five seconds to about twenty seconds after the green stock is injected therein. The articles may then, if desired, be subjected to a post-curing technique which is a stoving operation wherein the articles are maintained at elevated temperatures for several hours or even in some cases days.

The products made in accordance with this invention are advantageous in that no difficulty is experienced in any of the processing procedures for removing the finished article from the mold. Also no cracks, splits or nodules on the surface of the articles are observed in the finished product by the process of this invention.

The partially cured reaction mixture, i.e., green stock which is removed from the heated table may be stored for considerable lengths of time even at room temperature. This period of storage can be extended when refrigeration is employed.

The green stock after being removed from the heated table and extruded into filaments has high tensile strength on the order of about 5,000 pounds per square inch and higher. These filaments may then be oriented by curing the extruded filament under tension. This procedure greatly increases the tensile strength of the filament. The tensile strength of an oriented filament is on the order of 13,000 pounds per square inch or higher. The elongation of such filaments is also reduced by the orientation of the filament. This orientation reduced the elongation from about 600 to about 150 percent. The elongation set of the oriented filament is about zero percent while the elongation set of a filament which has not been oriented may be about 60 percent.

The semi-cured particles which are prepared by chopping the material removed from the heated table may have incorporated therein suitable dyes and pigments to produce uniformly colored products. This permits the polyurethane material to be colored by an extrusion process and then injection molded or compression molded to obtain a uniformly colored product. This is possible for the reason that even after extruding the material, it is not finally cured and can subsequently be injection molded, compression molded or re-extruded. Fillers may also be added.

The products prepared in accordance with the invention are suitable in all types of applications where an elastomeric product is desired. Particularly suitable applications include those where vibration damping is desired such as in motor mounts and the like. The elastic filaments prepared in accordance with this invention by extrusion are suitable for weaving into garments such as, for example, girdles, elastic stockings and the like.

The invention is further illustrated by the following examples in which parts are given by weight unless otherwise specified.

*Example 1*

To a mixture consisting of about 100 parts of an hydroxyl polyester having a molecular weight of about 2,000, an hydroxyl number of about 56, an acid number of about 1.5 and a water content of 0.15 prepared from about 11 mols of ethylene glycol and 10 mols of adipic acid and about 9 parts of 1,4-butanediol are added 40 parts of 4,4'-diphenylmethane diisocyanate which contains 4% of 2,4-diphenylmethane diisocyanate, 1.5% of dimeric 4,4'-diphenylmethane diisocyanate and has an acidity calculated as HCl of 0.017%. Prior to the intermixing of these three ingredients each is separately heated to a temperature of about 100° C. Upon the addition of the isocyanate to the polyester-butanediol mixture, mechanical mixing is conducted for a period of about 1 minute to insure the intimate contact of the ingredients. This reaction mixture is then cast onto a heated table maintained at a temperature of about 100° C. When the reaction mixture solidifies to the point where it can be readily removed and easily chopped, it is removed from the heated table and permitted to come to room temperature. The slab which is thus formed is then chopped into particles having the desired particle size depending on the subsequent use to which it is to be put.

*Example 2*

The chopped material prepared in accordance with Example 1 is fed into the hopper of an extrusion apparatus, the hopper being maintained at room temperature. This extrusion device has both a heated front and a rear section which are maintained at about 350–400° F. The die of the extruder is maintained at a temperature of about 410° F. The material is continuously extruded at a compression ratio of the screw of 4:1. A filament having a tensile strength of about 4700 pounds per square inch is obtained. This material, which is then placed under tension and further cured by being stoved at about 110° C. for about 24 hours, results in a product which visually appears unchanged from the originally extruded product, but which has a tensile strength of about 13,000 pounds per square inch. No voids or cracks appear in the filament of any time and the filament, even immediately after extrusion, is uniform in cross-section.

*Example 3*

The chunks of green stock obtained by the process of Example 1 are placed in a preheated cup mold maintained at about 360° F. A pressure of about 1800 pounds per square inch is applied for about 2 minutes. The mold is then permitted to cool while still under pressure to a temperature below about 150° F. The mold is then removed from the press and cooled with water. The molding is then readily removed and is further cured for about 12 hours at about 110° C. The resulting molded product exhibits outstanding tensile strength, tear resistance, elongation and abrasion resistance and contains no voids, cracks or surface imperfections.

*Example 4*

The particles obtained in the process of Example 1 are introduced into an injection molding device having the cylinder thereof, maintained at a temperature of about 400° F. The material is then injected under 600 p.s.i. pressure into a plurality of molds which are maintained at room temperature and held under pressure for about 15 seconds. The molding is then removed from the mold and post-curing in an oven maintained at about 110° C. for about 16 hours. These moldings also exhibits outstanding properties stated above in Example 3.

*Example 5*

To a mixture consisting of about 100 parts of an hydroxyl polyester having a molecular weight of about 2000, an hydroxyl number of about 56, an acid number of about 0.7 and a water content of 0.05 prepared from about 11 mols of ethylene glycol and 10 mols of adipic acid and about 9 parts of 1,4-butanediol are added 40 parts of 4,4'-diphenylmethane diisocyanate which contains 4% of 2,4-diphenylmethane diisocyanate, 1.5% of dimeric 4,4'-diphenylmethane diisocyanate and has an acidity calculated as HCl of 0.0005%. Prior to the intermixing of these three ingredients each is separately heated to a temperature of about 100° C. Upon the addition of the isocyanate to the polyester-butanediol mixture, mechanical mixing is conducted for a period of about 1 minute to insure the intimate contact of the ingredients. This reaction mixture is then cast onto a heated table maintained at a temperature of about 100° C. When the reaction mixture solidifies to the point where it can be readily removed and easily chopped, it is removed from the heated table and permitted to come to room temperature. The slab which is thus formed is then chopped into particles having the desired particle size depending on the subsequent use to which it is to be put.

*Example 6*

The chopped material prepared in accordance with Example 5 is fed into the hopper of an extrusion apparatus, the hopper being maintained at room temperature. This extrusion device has both a heated front and rear section which are maintained at about 350–400° F. The die of the extruder is maintained at a temperature of about 410° F. The material is continuously extruded at a compression ratio of the screw of 4:1. A filament having a tensile strength of about 4700 pounds per square inch is obtained. This material which is then placed under tension and further cured by being stoved at about 110° C. for about 24 hours, results in a product which visually appears unchanged from the originally extruded product, but which has a tensile strength of about 13,000 pounds per square inch. No voids or cracks appear in the filament at any time and the filament, even immediately after extrusion, is uniform in cross-section.

*Example 7*

The chunks of green stock obtained by the process of Example 5 are placed in a preheated cup mold maintained at about 360° F. A pressure of about 1800 pounds per square inch is applied for about 2 minutes. The mold is then permitted to cool while still under pressure to a temperature below about 150° F. The mold is then removed from the press. The molding is then readily removed and is further cured for about 12 hours at about 110° C. The resulting molded product exhibits outstanding tensile strength, tear resistance, elongation and abrasion resistance and contains no voids, cracks or surface imperfections.

*Example 8*

The particles obtained in the process of Example 5 are introduced into an injection molding device having the cylinder thereof, maintained at a temperature of about 400° F. The material is then injected under 600 p.s.i. pressure into a plurality of molds which are maintained at room temperature and held under pressure for about 15 seconds. The molding is then removed from the mold and post-curing in an oven maintained at about 110° C. for about 16 hours. These moldings also exhibit outstanding properties stated above in Example 7.

*Example 9*

To a mixture consisting of about 100 parts of an hydroxyl polyester having a molecular weight of about 2000, an hydroxyl number of about 56, an acid number of about 3.0 and a water content of 0.3% prepared from about 11 mols of ethylene glycol and 10 mols of adipic acid and about 9 parts of 1,4-butanediol are added 40 parts of 4,4'-diphenylmethane diisocyanate which contains 6% of 2,4-diphenylmethane diisocyanate, 3% of dimeric 4,4'-diphenylmethane diisocyanate and has an acidity calculated as HCl of 0.03%. Prior to the intermixing of these three ingredients each is separately heated to a temperature of about 100° C. Upon the addition of the isocyanate to the polyester-butanediol mixture, mechanical mixing is conducted for a period of about 1 minute to insure the intimate contact of the ingredients. This reaction mixture is then cast onto a heated table maintained at a temperature of about 100° C. This reaction mixture takes substantially longer to solidify than that of Examples 1 and 5. When the reaction mixture solidifies to the point where it can be readily removed, it is removed from the heated table and permitted to come to room temperature. The slab which is thus formed is then chopped into particles having the desired particle size depending on the subsequent use to which it is to be put. The time which this green stock may be stored at 75° C. and still be processable as in Examples 6, 7 and 8 is substantially shorter than that for the green stock prepared in Examples 1 and 5.

*Example 10*

The chopped material prepared in accordance with Example 9 is fed into the hopper of an extrusion apparatus, the hopper being maintained at room temperature. This extrusion device has both a heated front and rear section which are maintained at about 350–400° F. The die of the extruder is maintained at a temperature of about 410° F. The material is continuously extruded at a compression ratio of the screw of 4:1. A filament having a tensile strength of about 3,000 pounds per square inch is obtained. This material which is then placed under tension and further cured by being stoved at about 110° C. for about 24 hours, results in a product which visually appears unchanged from the originally extruded product, but which has a tensile strength of about 5,000 pounds per square inch. The extruded material contains bubbles and the surface is uneven due to nodules of more highly cured areas which appear theron.

*Example 11*

The chunks of green stock obtained by the process of Example 9 are placed in a preheated cup mold maintained at about 360° F. A pressure of about 1800 pounds per square inch is applied for about 2 minutes. The mold is then permitted to cool while still under pressure to a temperature below about 150° C. The mold is then removed from the press and cooled with water. The molding is then removed and is further cured for about 12 hours at about 110° C. The resulting molded product contains voids and nodules which cause the molded object to have a shape other than that imparted by the mold.

*Example 12*

The particles obtained in the process of Example 9 are introduced into an injection molding device having the cylinder thereof, maintained at a temperature of about 400° F. The material is then injected under 600 p.s.i. pressure into a plurality of molds which are maintained at room temperature and held under pressure for about 15 seconds. The molding is then removed from the mold and post-curing in an oven maintained at about 110° C. for about 16 hours. These moldings also exhibit imperfections as do those of Example 11.

*Example 13*

To a mixture consisting of about 100 parts of an hydroxyl polyester having a molecular weight of about 2,000, an hydroxyl number of about 56, an acid number of about 0.3 and a water content of about 0.008 prepared from about 11 mols of ethylene glycol and 10 mols of adipic acid and about 9 parts of 1,4-butanediol are added 40 parts of 4,4'-diphenylmethane diisocyanate which contains 6% of 2,4-diphenylmethane diisocyanate, 3% of dimeric 4,4'-diphenylmethane diisocyanate and has an acidity calculated as HCl of 0.00009%. Prior to the intermixing of these three ingredients each is separately heated to a temperature of about 100° C. Upon the addition of the isocyanate to the polyester-buatnediol mixture, mechanical mixing is conducted for a period of about 1 minute to insure the intimate contact of the ingredients. This reaction mixture is then cast onto a heated table maintained at a temperature of about 100° C. The reaction proceeds very rapidly and solidifies to the point where it must be removed in a very short time. The solid material is removed from the heated table and permitted to come to room temperature. The slab thus formed contains particles of insoluble matter and many imperfections, e.g., cracks, splits and areas of shrinkage. The slab is chopped into particles having the desired particle size depending on the subsequent use to which it is to be put.

*Example 14*

The chopped material prepared in accordance with Example 13 is fed into the hopper of an extrusion apparatus, the hopper being maintained at room temperature. This extrusion device has both a heated front and rear section which are maintained at about 400° F. The die of the extruder is maintained at a temperature of about 410° F. The material is continuously extruded at a compression ratio of the screw of 4:1. A filament having many flaws and a tensile strength of about 2,000 pounds per square inch is obtained. Because of flaws, this material is not suitable for further cure under tension to develop greater strength.

*Example 15*

The chunks of green stock obtained by the process of Example 13 are placed in a preheated cup mold maintained at about 360° F. A pressure of about 1800 pounds per square inch is applied for about 2 minutes. The mold is then permitted to cool while still under pressure to a temperature below about 150° F. The mold is then removed from the press and cooled with water. The molding is then readily removed and is further cured for about 12 hours at about 110° C. The resulting molded product exhibits nodules which cause the molded object to have a shape other than that imparted by the mold and contains particles of material not soluble in the main polymer phase which are flaws and greatly weaken the product.

*Example 16*

The particles obtained in the process of Example 13 are introduced into an injection molding device having the cylinder thereof, maintained at a temperature of about 350–400° F. The material is then injected under 600 p.s.i. pressure into a plurality of molds which are maintained at room temperature and held under pressure for about 15 seconds. The molding is then removed from the mold and post-curing in an oven maintained at about 110° C. for about 16 hours. These moldings also exhibit imperfections as do those of Example 15.

*Example 17*

About 100 parts of a polyester having a molecular weight of about 1,000, an hydroxyl number of about 112, an acid number of about 1.0 and a water content of 0.1% prepared by reacting adipic acid with diethylene glycol is heated to a temperature of about 100° C. and admixed with about 54 parts of 4,4'-diphenylmethane diisocyanate containing about 3.0% of 2,4'-diphenylmethane diisocyanate, 1% of dimeric-4,4'-diphenylmethane diisocyanate and having an acidity calculated on percent HCl of about 0.015% which is also heated to a temperature of about 100° C. and about 9 parts of 1,4-butanediol which is heated to about 100° C. The reaction mixture is cast onto a heated table in accordance with the procedure set forth in Example 1. The resulting products prepared with this material according to Examples 2, 3 and 4 exhibit a Shore A hardness of about 90 to about 95, exhibit high tear strength, are uniform in composition throughout and contain substantially no imperfections such as voids, cracks or nodules.

*Example 18*

About 100 parts of the polyester utilized in Example 1, about 60 parts of 4,4'-diphenylmethane diisocyanate containing about 2.5% of 2,4'-diphenylmethane diisocyanate, about 1.5% of dimeric-4,4'-diphenylmethane diisocyanate and having an acid number of about 0.010 and about 16.2 parts of 1,4-butanediol are heated individually to about 100° C. and then mixed by mechanical agitation for a period of about 1 minute. This reaction material is then poured onto a heated table in accordance with the procedure of Example 1 and subsequently processed by the procedure of Examples 2, 3 and 4. The resulting product has a Shore D hardness of from about 50 to about 55, exhibits high tear strength and contains substantially no imperfections in either the extruded or molded products.

*Example 19*

About 100 parts of the polyester prepared according to Example 1, about 40 parts of the 4,4'-diphenylmethane diisocyanate of Example 1 and about 19 parts of 1,4-phenylene-bis-β-hydroxyethyl ether are heated individually to about 100° C. The 1,4-phenylene-bis-β-hydroxyethyl ether and the polyester are then combined and the isocyanate is added to this mixture with mechanical stirring taking place for approximately 1 minute. This mixture is then poured onto a heated table and processed according to the procedure of Example 1. The product resulting upon compression molding exhibits outstanding physical properties with relation to tensile strength, elongation, tearing resistance and abrasion resistance and contains substantially no voids, cracks or nodules on the surface of the molding.

*Example 20*

The procedure of Example 19 is followed with the exception that 16.1 parts of 1,4-phenylene-bis-β-hydroxyethyl ether and about 0.35 part of trimethylolpropane are substituted for about 19 parts of 1,4-phenylene-bis-β-hydroxyethyl ether. The resulting compression molding cycle is reduced in time permitting a shorter demolding time while the molded product is still hot without seriously affecting the good physical properties obtained in the procedure of Example 19.

*Example 21*

To about 100 parts of the polyester of Example 1, heated to a temperature of about 100° C., is added about 6.3 parts of 1,4-butanediol and about 3.13 parts of diethylene glycol which have also been previously heated to about 100° C. To this mixture are added about 40 parts of the 4,4'-diphenylmethane diisocyanate of Example 1 which has also been heated to about 100° C. This reaction mixture is then processed in accordance with the procedure set forth in Example 1 to obtain a semi-cured ground product which when processed according to Examples 2, 3 and 4 results in an elastomeric product having a Shore A hardness of about 70 and substantially no cracks, voids or nodules on the surface thereof.

It can thus be seen that the products prepared using reactive components within the critical values set forth contain few imperfections while reactants without this critical range are unsuitable because of voids, cracks and nodules which appear in the finished moldings or extrusions.

Although the invention has been described in considerable detail for the purpose of illustration, it is to be understood that variations may be made therein by those skilled in the art without departing from the spirit of the invention and the scope of the claims.

What is claimed is:

1. A method of preparing polyurethane elastomeric plastics which comprises reacting an hydroxyl polyester prepared by the process which comprises condensing adipic acid with a glycol to an acid number of from about 0.5 to about 2.0 and removing water therefrom until the water content is from about 0.01% to about 0.2% with 4,4'-diphenylmethane diisocyanate containing less than 5% of 2,4'-diphenylmethane diisocyanate, less than 2.0% of dimeric 4,4'-diphenylmethane diisocyanate and having an acidity calculated as HCl of from about 0.0001% to about 0.020% and a chain extending agent, conducting the liquid reaction mixture onto a heated surface, removing the solidified mass formed thereon and shaping said mass under heat and pressure to the desired configuration.

2. A method of preparing polyurethane elastomeric plastics which comprises reacting an hydroxyl polyester having a molecular weight of at least 600 and an hydroxyl number of from about 25 to about 190 and prepared by the process which comprises condensing adipic acid with a glycol to an acid number of from about 0.5 to about 2.0 and removing water therefrom until the water content is from about 0.01% to about 0.2% with 4,4'-diphenylmethane diisocyanate containing less than 5% of 2,4'-diphenylmethane diisocyanate, less than 2.0% of dimeric 4,4'-diphenylmethane diisocyanate and having an acidity calculated as HCl of from about 0.0001% to about 0.020% and a chain extending agent, conducting the liquid reaction mixture onto a heated surface, removing the solidified mass formed thereon and shaping said mass under heat and pressure to the desired configuration.

3. A method of preparing polyurethane elastomeric plastics which comprises reacting an hydroxyl polyester prepared by the process which comprises condensing adipic acid with a glycol to an acid number of from about 0.5 to about 2.0 and removing water therefrom until the water content is from about 0.01% to about 0.2% with 4,4'-diphenylmethane diisocyanate containing less than 5% of 2,4'-diphenylmethane diisocyanate, less than 2.0% of dimeric 4,4'-diphenylmethane diisocyanate and having an acidity calculated as HCl of from about 0.0001% to about 0.020% and a bifunctional chain extending agent containing active hydrogen containing groups in the molecule which are reactive with isocyanate groups, conducting the liquid reaction mixture onto a heated surface, removing the solidified mass formed thereon and shaping said mass under heat and pressure to the desired configuration.

4. A method of preparing polyurethane elastomeric plastics which comprises reacting an hydroxyl polyester prepared by the process which comprises condensing adipic acid with a glycol to an acid number of from about 0.5 to about 2.0 and removing water therefrom until the water content is from about 0.01% to about 0.2% with 4,4'-diphenylmethane diisocyanate containing less than 5% of 2,4'-diphenylmethane diisocyanate, less than 2.0% of dimeric 4,4'-diphenylmethane diisocyanate and having an acidity calculated as HCl of from about 0.0001% to about 0.020% and 1,4-butanediol, conducting the reaction mixture onto a heated surface, removing the solidified mass formed thereon and shaping said mass under heat and pressure to the desired configuration.

5. A method of preparing polyurethane elastomeric plastics which comprises reacting an hydroxyl polyester prepared by the process which comprises condensing adipic acid with a glycol to an acid number of from about 0.5 to about 2.0 and removing water therefrom until the water content is from about 0.01% to about 0.2% with 4,4'-diphenylmethane diisocyanate containing less than 5% of 2,4'-diphenylmethane diisocyanate, less than 2.0% of dimeric 4,4'-diphenylmethane diisocyanate and having an acidity calculated as HCl of from about 0.0001% to about 0.020% and 1,4-phenylene-bis-β-hydroxyethyl ether, pouring the liquid reaction mixture onto a heated surface, removing the solidified mass formed thereon and shaping said mass under heat and pressure to the desired configuration.

6. The process of claim 1 in which the three reactants are individually heated to a temperature of from about 60° C. to about 155° C. and then reacted.

7. A method of preparing polyurethane polymers processable by thermoplastic techniques which comprises reacting an hydroxyl polyester prepared by the process which comprises condensing adipic acid with a glycol to an acid number of from about 0.5 to about 2.0 and removing water therefrom until the water content is from about 0.01% to about 0.2% and a chain-extending agent selected from the group consisting of glycols, organic diamines and amino alcohols with 4,4'-diphenylmethane diisocyanate containing less than 5% of 2,4'-diphenylmethane diisocyanate, less than 2.0% of dimeric 4,4'-diphenylmethane diisocyanate and having an acidity calculated as HCl of from about 0.0001% to about 0.020% continuing said reaction until a solid results and substantially immediately cooling said solid to room temperature.

References Cited by the Examiner
UNITED STATES PATENTS

| | | | |
|---|---|---|---|
| 2,625,531 | 1/53 | Seeger. | |
| 2,625,535 | 1/53 | Mastin | 260—75 |
| 2,938,054 | 5/60 | Demers et al. | 260—453 |
| 3,016,364 | 1/62 | Müller | 260—75 |
| 3,036,042 | 5/62 | Schmidt et al. | 260—75 |

LEON J. BERCOVITZ, *Primary Examiner.*

HAROLD N. BURSTEIN, DONALD E. CZAJA,
*Examiners.*